[82.] *C. M. Bridges. Measuring Can*
No. 119,114. Fig. 1. Patented Sep. 19, 1871.
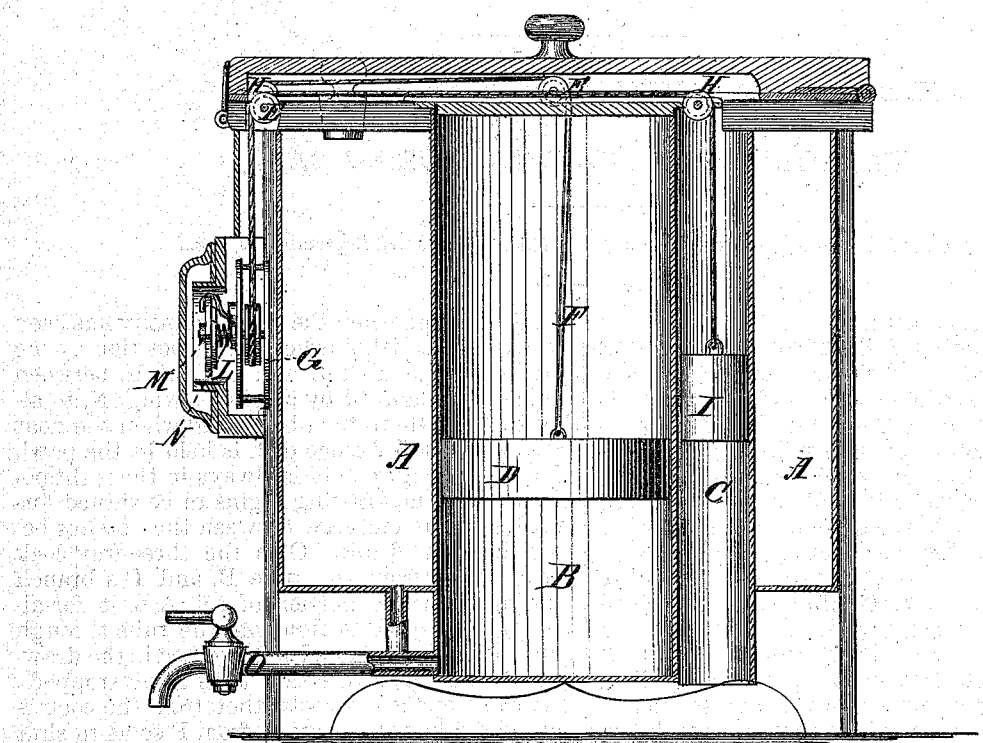
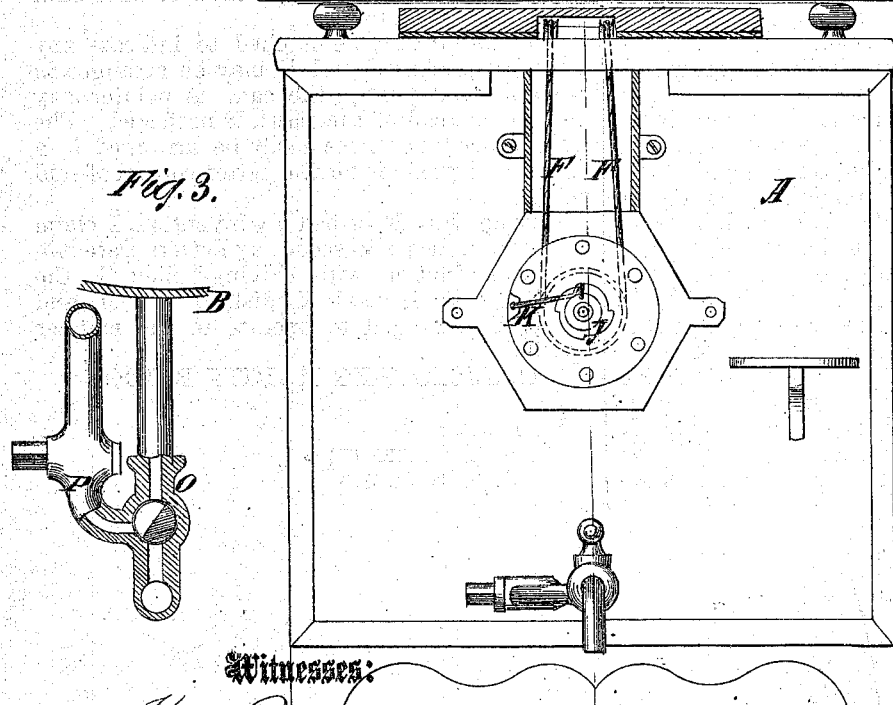
Witnesses:
John Becker.
Wm. H. C. Smith.
Inventor:
C. M. Bridges
Per Munn & Co
Attorneys.

UNITED STATES PATENT OFFICE.

CHRISTOPHER MARTIN BRIDGES, OF LEON, IOWA.

IMPROVEMENT IN LIQUID-MEASURING CAN.

Specification forming part of Letters Patent No. 119,114, dated September 19, 1871.

*To all whom it may concern:*

Be it known that I, CHRISTOPHER MARTIN BRIDGES, of Leon, in the county of Decatur and State of Iowa, have invented a new and Improved Automatic Measuring-Can; and I do hereby declare that the following is a full, clear, and exact description thereof, which will enable others skilled in the art to make and use the same, reference being had to the accompanying drawing forming part of this specification.

My invention consists in the improvement of liquid-measures, as hereinafter fully described and subsequently pointed out in the claim.

Figure 1 is a sectional elevation of a can having my improved measuring apparatus applied. Fig. 2 is a side elevation with a part sectioned, and Fig. 3 is a section of the three-way cock employed for drawing from the tube and filling it from the other part of the can.

Similar letters of reference indicate corresponding parts.

A is an ordinary sheet-metal can, with a large vertical tube, B, and a smaller one, C, extending from bottom or below the bottom to top. D is a float in the larger one intended to rest on the liquid and partly suspended by a cord, F, passing up over pulleys E, down the side of the can, around a pulley, G, back over pulleys H, and down in tube C to a weight, I, suspended by it. The pulley G carries a notched disk, J, on its front end, which will be turned the distance between two notches by the falling of the float when a given quantity of fluid is drawn, say a pint, the parts being accurately adjusted therefor. K is a pawl resting on the edge of the disk and dropping into the notches as each one comes under it, showing when the given quantity has been drawn. The disk J is held in its position by the friction of the disk L and the nut M, between which it is clamped by a coiled spring, N, to allow the spindle to turn backward when the float rises, while the notched disk is held by the pawl. The disk being so held is always in the right position when the drawing begins to be turned forward just one measure between the notches before the pawl drops. O is the three-way cock for drawing from the tube B, and P a branch leading from the bottom of can A to it, for allowing the liquid to flow into the tube through said cock when adjusted as indicated in the drawing, the flow from the said tube being stopped; but when opened to draw therefrom the cock is turned against the passage from P so as to shut off the flow therefrom.

The disk J may be notched to indicate any measures preferred, and it may be arranged in any approved part of the can. A pointer may be used instead of the pawl, if preferred. The weight need not necessarily be arranged in a tube, but I prefer it for the better control of said weight.

Having thus described my invention, I claim as new and desire to secure by Letters Patent—

In combination with driving-pulley G, the notched disk J, pawl K, disk L, nut M, and spring N, arranged to operate in the manner specified.

CHRISTOPHER MARTIN BRIDGES.

Witnesses:
J. H. GARRETT,
JNO. F. YOUNG.